United States Patent [19]

Yamazaki

[11] E Re. 29,403

[45] Reissued Sept. 20, 1977

[54] QUARTZ CRYSTAL WRIST WATCH

[75] Inventor: Satoshi Yamazaki, Owa Suwa, Japan

[73] Assignee: Kabushiki Kaisha Suwa Seikosha, Tokyo, Japan

[21] Appl. No.: 711,176

[22] Filed: Aug. 3, 1976

Related U.S. Patent Documents

Reissue of:

[64] Patent No.: 3,902,312
Issued: Sept. 2, 1975
Appl. No.: 457,009
Filed: Apr. 1, 1974

U.S. Applications:

[63] Continuation-in-part of Ser. No. 166,501, July 27, 1971, Pat. No. 3,800,523.

[30] Foreign Application Priority Data

July 27, 1970 Japan ..... 45-65035
Sept. 10, 1970 Japan ..... 45-78803

[51] Int. Cl.[2] ..... G04C 3/00; G04B 29/02

[52] U.S. Cl. ..... 58/23 D; 58/52 R; 58/104

[58] Field of Search ..... 58/7, 8, 23 R, 23 A, 58/23 BA, 23 D, 52, 104

[56] References Cited

U.S. PATENT DOCUMENTS

| | | | |
|---|---|---|---|
| 3,432,698 | 3/1969 | McCarty | 58/23 R |
| 3,541,778 | 11/1970 | Ingenito | 58/23 R |
| 3,597,915 | 8/1971 | Aizawa | 58/23 D |
| 3,645,088 | 2/1972 | Luscher | 58/23 A |
| 3,664,118 | 5/1972 | Waiton | 58/23 A |

FOREIGN PATENT DOCUMENTS

| | | | |
|---|---|---|---|
| 1,372,132 | 8/1964 | France | 58/23 R |

*Primary Examiner*—E. S. Jackmon
*Attorney, Agent, or Firm*—Blum, Moscovitz, Friedman & Kaplan

[57] ABSTRACT

A quartz crystal wrist watch wherein means are provided for removably mounting along the periphery of the watch the battery power source, the oscillator and associated circuitry and an electro-mechanical converter. The electro-mechanical converter is provided with a rotor coupled to the gear train of the watch positioned in the central portion thereof. The oscillator and associated circuitry are removably mounted in said watch by means of a resin case adapted to carry said oscillator and associated circuitry.

6 Claims, 7 Drawing Figures

FIG. 1
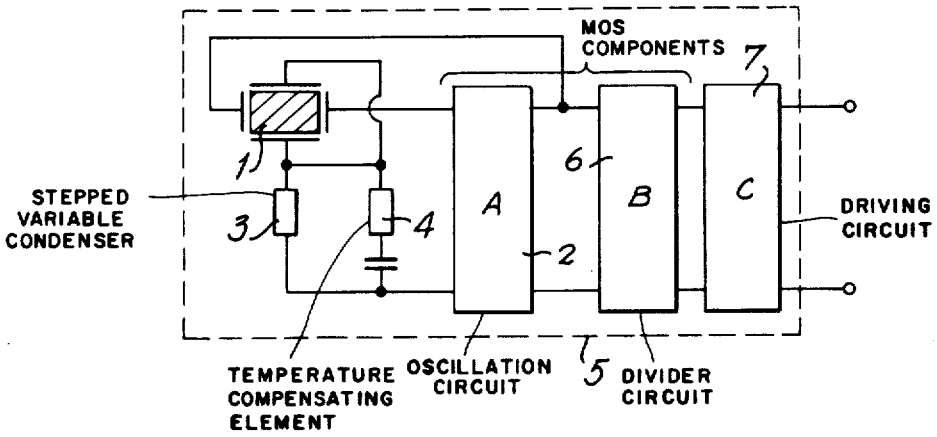
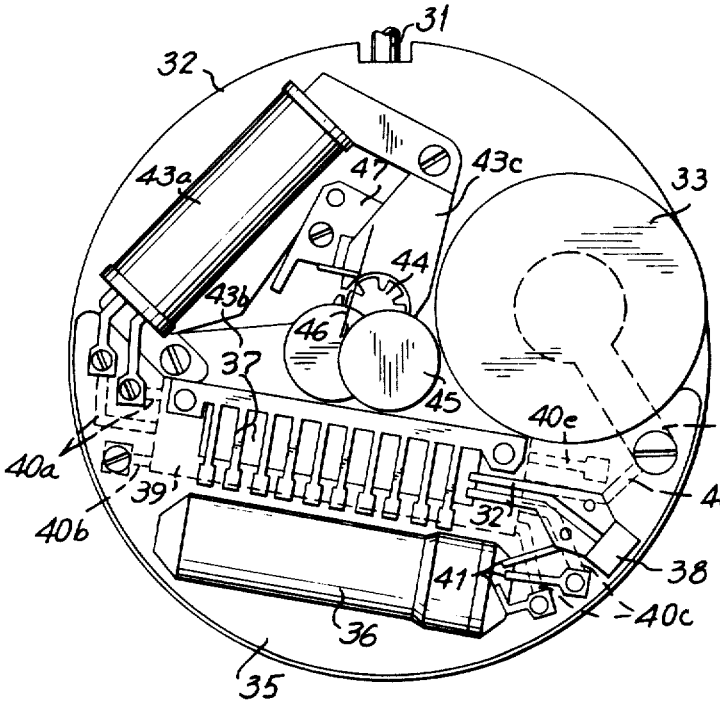
FIG. 5

QUARTZ CRYSTAL WRIST WATCH

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of my copending application Ser. No. 166,501, filed July 27, 1971 now U.S. Pat. No. 3,800,523.

BACKGROUND OF THE INVENTION

This invention relates to quartz crystal wrist watches and to the physical structure thereof. Quartz crystal wrist watches are generally provided with a battery power source, a crystal oscillator which serves as a time standard and associated circuitry for converting the output of the oscillator to the desired driving signal, an electro-mechanical converter responsive to said driving signal such as a pulse motor and indexing mechanism, and the drive train of the watch.

These components must be mounted in a watch so as to provide a compact thin structure. Further, although it is more [convenience] *convenient* to mount these components in a square watch, there is a larger demand for round wrist watches, thereby complicating the mounting of these structures into a watch case. Thus, the battery power source requires a substantial portion of the space of the wrist watch, and being generally round in shape, occupies a greater space than its volume would otherwise indicate. Further, if other components are mounted above or below the battery, the thickness of the watch would be substantially increased.

The oscillator and associated circuitry includes the crystal oscillator generally mounted in a vacuum in a hermetic sealed case provided with a shield cap and external lead terminal, an oscillation circuit, a fine adjusted mechanism for adjusting the frequency of the oscillator, a temperature compensating element, a divider circuit for dividing the frequency of the output of the crystal oscillator, and a driving circuit for the electromechanical converter. If these components are separately mounted, assembly and repair of the watch becomes difficult and expensive. Further, the method of mounting these components must avoid frequency changes due to stray capacitance and external shock.

By the compact assembly approach of the invention, the foregoing difficulties are solved.

SUMMARY OF THE INVENTION

Generally speaking, in accordance with the invention, the components of a quartz crystal wrist watch are mounted so that the battery power source, the oscillator and associated circuitry and the electro-mechanical converter are mounted on the periphery of the watch, with the rotor of said electromechanical converter being positioned centrally of said watch for cooperative engagement with the drive train of said watch, also located in the central portion thereof. The oscillator and associated circuitry are removably mounted on said watch by means of a resin case provided with grooves therein for receiving the various components.

Accordingly, the object of the invention is to provide a compact electronic crystal wrist watch having a round configuration.

Another object of the invention is to provide an electronic quartz crystal wrist watch incorporating a tuning fork crystal oscillator as the time standard having a frequency of more than 16 kHz, oscillation and divider circuits including MOS transistors, a driving circuit including integrated circuits, and a pulse motor serving as an electro-mechanical converter.

A further object of the invention is to provide a quartz crystal wrist watch wherein the various components thereof are readily connected together for ease in after sale service and assembly, and wherein the crystal oscillator and the associated circuitry thereof are removably mounted as a unit.

Still another object of the invention is to provide a quartz crystal wrist watch having a time standard oscillator not affected by the environment, such as external disturbances due to shock or ambient stray capacitance.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a circuit diagram of a quartz crystal wrist watch according to the invention;

FIG. 5 is a full plan view of the quartz crystal wrist watch according to the invention;

DESCRIPTION OF THE PREFERRED EMBODIMENTS

Figure 2:
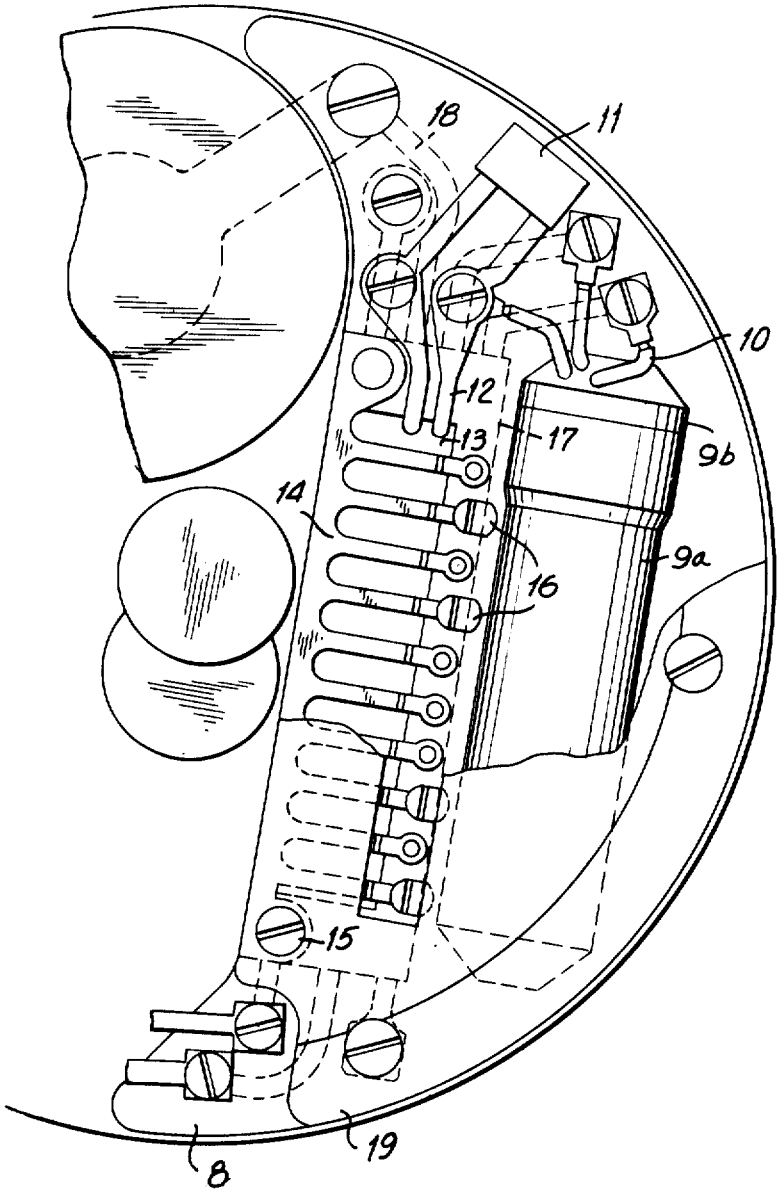
FIG. 2 is a fragmentary plan view of the quartz crystal wrist watch according to the invention showing in particular the crystal oscillator and circuitry associated therewith according to the invention.

Referring now to FIG. 1, wherein an equivalent circuit diagram of the time standard oscillator and associated circuitry of the watch according to the invention is depicted, crystal oscillator 1 is shown coupled to an oscillation circuit 2, in part through a stepped variable condenser 3 for adjusting the frequency of the oscillator and a temperature compensating element 4. A resin case for receiving the oscillator and its associated circuitry is shown schematically by dashed line 5, said associated circuitry including a divider circuit 6 for reducing the frequency of the output signal of the oscillator and a driving circuit 7 for driving the motor or other electromechanical converter.

Referring now to FIG. 2, the time standard oscillator and associated circuitry is shown mounted on a resin case 8 which may be formed, for example, from an [eleastic] *elastic* resin having thermosetting properties, which resin case is in turn mounted in the quartz crystal wrist watch according to the invention. The time standard crystal oscillator is mounted within a cylindrical crystal oscillator casing 9a. The crystal oscillator is mounted within said casing on a stem, and is provided with three external lead terminals 10. Casing 9a is evacuated, and is sealed hermetically.

The crystal oscillator utilized as time standard may be a tuning fork crystal oscillator having a frequency of more than 16 kHz. An alternate type of oscillator is a leaf spring oscillator, which is advantageous for mass production, but requires 23 mm in length where a frequency of 16 kHz is required, and where resistance to outside shocks is required. A leaf spring oscillator of less than 23 mm in length is substantially affected by the suspension wire and may not be used as a time standard source in a wrist watch. The length of the leaf spring oscillator is even further increased to about 28 mm when it is suspended within a hermetically sealed case by a shock resistant mounting. For the foregoing reasons, the leaf spring oscillator is not particularly adapted for use in compact and round wrist watch movements, and accordingly, the tuning fork oscillator is preferred. Said tuning fork oscillator may be only 13 mm in length, and may be specially mounted and sealed hermetically within a cylindrical metal case of only 16 mm in length.

The crystal oscillator casing 9a is provided with a cap 9b on the external lead terminal portion thereof in order to minimize the effect of stray capacitance between said external lead terminals and other portions of the circuitry. The lead wires pass through windows in portions of said cap, but the crystal oscillator is shielded. The temperature compensating element 11 is formed of $BaTiO_3$ and is wired to other lead elements by a terminal plate 12.

Also mounted on resin case 8 is a stepped variable condenser for fine adjustment of frequency of said oscillator. Said condenser consists of a group of condensers formed on a glass substrate 13 by vacuum evaporation. A contact spring 14 is mounted on said resin plate by means of screw 15 above said glass substrate. The separate condensers deposited on substrate 13 can be selectively added to or removed from the circuit to determine the total capacitance thereof by means of a group of pins 16 which selectively engage one of the fingers of contact spring 14 to bring said finger into engagement with the corresponding capacitor on the substrate. In other words, the fingers of contact spring 14 may be selectively brought into and out of engagement with the capacitors on substrate 13 by inserting or removing pin 16.

The oscillation circuit, divider circuit and driving circuit formed from MOS transistor components and integrated circuits, are mounted on the opposed side of resin case 8 opposite substrate 13. Said components are retained within the resin case by means of an epoxy resin which protects said components from outside influences such as moisture. Said electronic circuits include a 15-stage flip-flop divider circuit for dividing the frequency of the output of the oscillator circuit and a reset circuit. Both the oscillation and divider circuits may be formed of hybrid integrated circuits, but if MOS circuits are utilized, both the oscillation and divider circuits can be incorporated in about a 2 mm square space. Even with the use of epoxy resins, by using MOS circuits, the space required for the oscillation and divider circuitry can be reduced by from one-half to one-third, as compared with the space required by conventional type of circuits using only integrated circuits. The lead terminals of the electric circuits mounted below the resin case 8 are electrically connected to the components above said resin case by means of screws and pin connectors, as well as a group of lead terminals 18 preferably formed as thin plates. The top surface of the resin case may be enclosed by a metal holder 19 which serves as a shield plate for the capacitors on substrate 13, and as a retention device for contact spring 15, pin 16 and crystal oscillator 9a.

Figure 3:
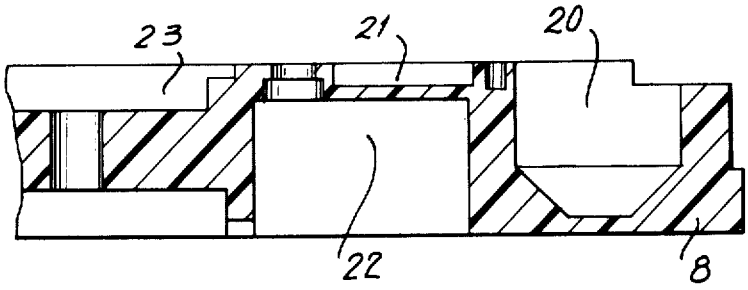
FIG. 3 is a cross-sectional view of a resin case for receiving said time standard oscillator and associated circuitry.
Figure 4:
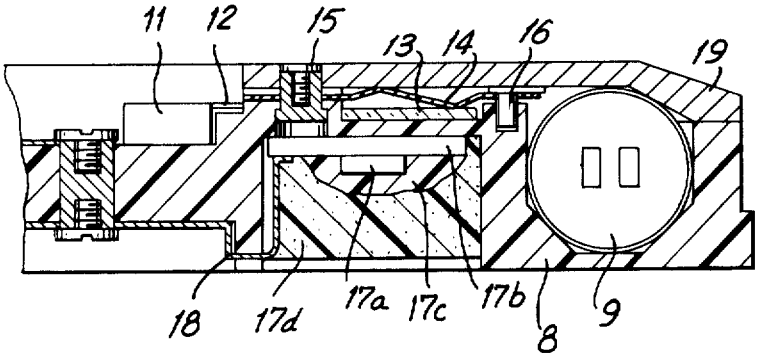
FIG. 4 is a cross-sectional view of the resin case of FIG. 3 having said time standard oscillator and associated circuitry mounted therein.

Referring now to FIGS. 3 and 4, we see that the top surface of resin case 8 is formed with a channel 20 for receiving the crystal oscillator 9, a channel 21 for receiving the stepped variable condenser substrate 13, and a channel 23 for receiving the temperature compensating element 11. The back of resin case 8 is provided with a channel 22 for receiving the oscillation and divider circuits 17a, the driving circuit 17b which is coupled to an electro-mechanical converter, silicon 17c for protecting the circuits, and an epoxy resin 17d for retaining said components together. The channel 21 for receiving the stepped variable condenser substrate and channel 22 for receiving the electric circuits are positioned in overlapping relation on opposed sides of the resin case.

Accordingly, it is seen that the components of the crystal oscillator and its associated circuitry are all mounted on resin case 8 for removal from and mounting in the quartz crystal watch case according to the invention as a unit. The structure is extremely compact, occupying from about one-third to about one-fifth of the volume of the available space in the watch. The foregoing arrangement greatly enhances both the initial manufacture and the aftersale maintenance of the watch, since the entire time standard oscillator assembly can be replaced as a unit, and can be worked on outside of the watch. The structure is particularly shielded to prevent the adverse effect of stray capacitance on the oscillator. Further, the crystal oscillator is firmly mounted within the resin case which is elastic, and therefore assists in shock resistance.

Referring now to FIG. 5, the quartz crystal watch depicted therein is provided with a stem 31 disposed at the position of 12 O'clock, on a round plate 32. A battery 33 is mounted on said plate at about 3 O'clock. As noted above, the battery is round but is positioned at the periphery of the watch. A negative pulse terminal plate 34 connects the battery 33 to the oscillator circuitry which is mounted on resin case 35. Said resin case is similar to the resin case 8 described above, in that it supports all of the components of the oscillator and associated circuitry for removable mounting on plate 32. The crystal oscillator casing 36 containing the crystal oscillator is disposed in a channel on the top surface of resin case 35. Fine adjustment of the frequency of the oscillator is provided by stepped condenser 37 similar in structure to the condenser 13, 14, 15 and 16 of FIGS. 2 and 4. Also mounted on the resin case is the temperature compensating device 38. The electronic circuitry 39 is fixed on the opposed side of resin case 35 opposite the stepped condenser. The input and output terminals of said electronic circuitry include electrical signal terminal 40a for applying the driving signal to the pulse motor which serves as the electromechanical converter. These terminals all extend from one of the electronic circuitry, namely the side on which said pulse motor is positioned. The remaining terminals all extend from the opposed side of the electronic circuitry. Specifically, terminals 40c are connected to the crystal oscillator, terminal 40d is connected to the negative pulse terminal 34 of the battery, and terminal 40e is a reset terminal. The latter terminals are all positioned on the side of the electronic circuitry adjacent the battery. The output and input terminals of the tuning fork crystal oscillator 41 are also disposed on the battery side of the oscillator case 36, in order to simplify the terminal connection with the circuitry. Leads 42 are provided for connecting the stepped condenser and temperature compensating device. Coupled to the electrical circuitry 39 by leads 40a is the electro-mechanical converter 43a which converts the electrical output signal from said circuit into rotary movement of the gear train of the watch. Said electromechanical converter includes a coil 13a formed from copper wire having 2.5/100$\phi$ mm, which wire is wound in about 15,000 turns on a coil core formed of magnetic material. Coil 43a defines the driving coil of the pulse motor and is substantially cylindrical in shape. The output signal from said circuit consists of an alternating pulse train, one pulse of which is applied to said driving coil each second. The magnetomotive force generated in the coil is applied to stators 43b and 43c to rotate a rotor 44 in predetermined angular increments. The rotor 44 may be made of Pt CO material and is provided with six poles formed alternately as north and south poles.

The above described pulse motor is utilized in place of the conventional pallet-fork escapement as an electro-mechanical converter, since said pallet-fork [escaptement] *escapement* occupies too large an area, and would preclude the provision of a round compact wrist watch. Thus, the pallet-fork escapement has an outer diameter of about 5~7$\phi$mm, while the outside diameter of the pulse motor is only about 3$\phi$mm. However, the cylindrical shape of the driving coil 43a precludes the mounting of any components above or below said coil, where a thin wrist watch is desired. Accordingly, said driving coil is positioned on the periphery of the watch according to the invention.

Rotor 44 is rotated by the magnetomotive force and its rotating energy is transmitted to a fourth wheel 45 of the watch gear train, which in turn in operatively coupled to the gear train third wheel and center wheel for driving same. A second hand jumper 46 is coupled to fourth wheel 45 for indexing the position of the second hand. A regulating lever 17 for the operation of said second hand is also positioned in the central region of the watch, one end of said regulating lever being engaged with stem 31, the other end of said regulating lever being engaged with the end of jumper 46 for manipulating said jumper.

The quartz crystal wrist watch according to the invention consists of a plurality of components arranged on a round plate in such manner that the stem is favorably disposed near the 12 O'clock position, the battery is disposed near the 3 O'clock position, the time standard oscillator and associated circuitry are formed as a unit and positioned adjacent the battery, and the driving coil of the pulse motor is disposed between the time standard oscillator and the stem. Said battery, time standard oscillator and associated circuitry and pulse motor driving coil are positioned along the periphery of said round plate. The regulating mechanism, along with the drive train of the watch are positioned in the central region of the watch, whereby overlapping relation between the larger components is avoided.

Figure 6:
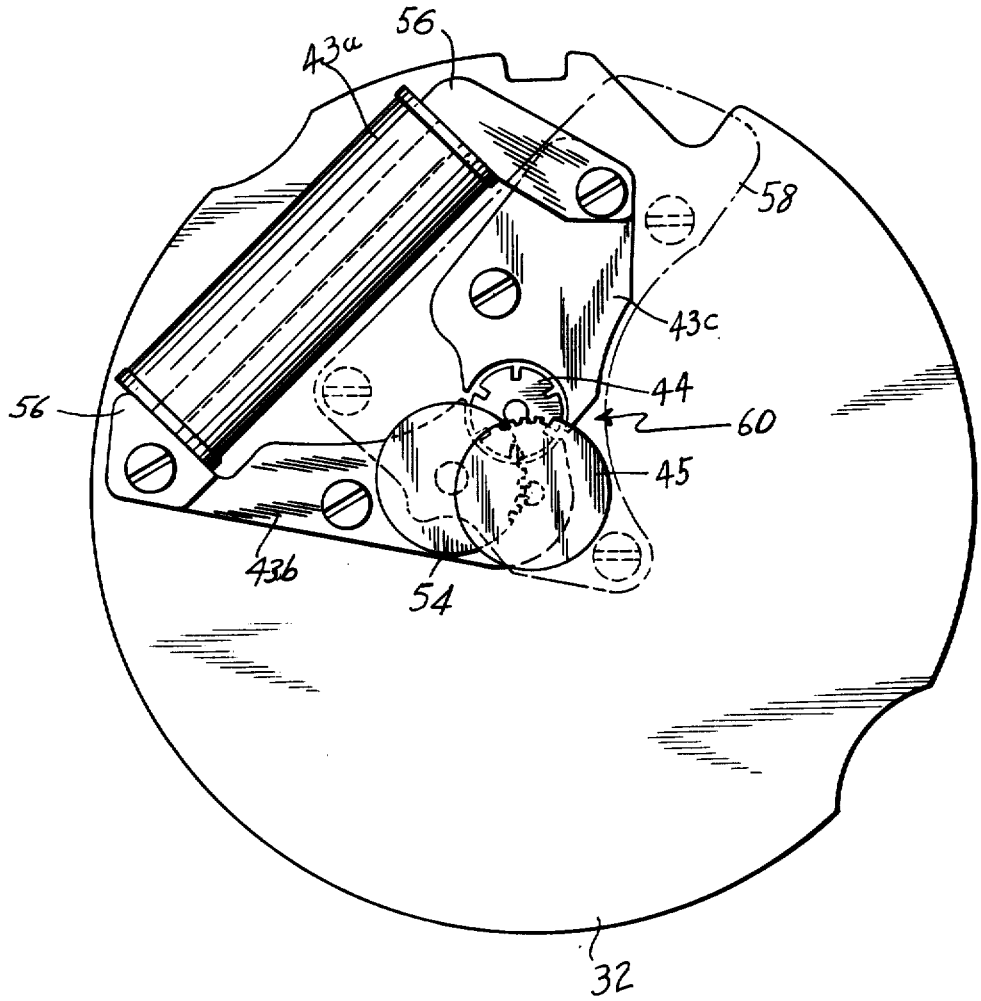
FIG. 6 is a plan view of a quartz crystal wrist watch showing the stepping motor mechanism and associated portion of the drive train constructed in accordance with the instant inventor.
Figure 7:
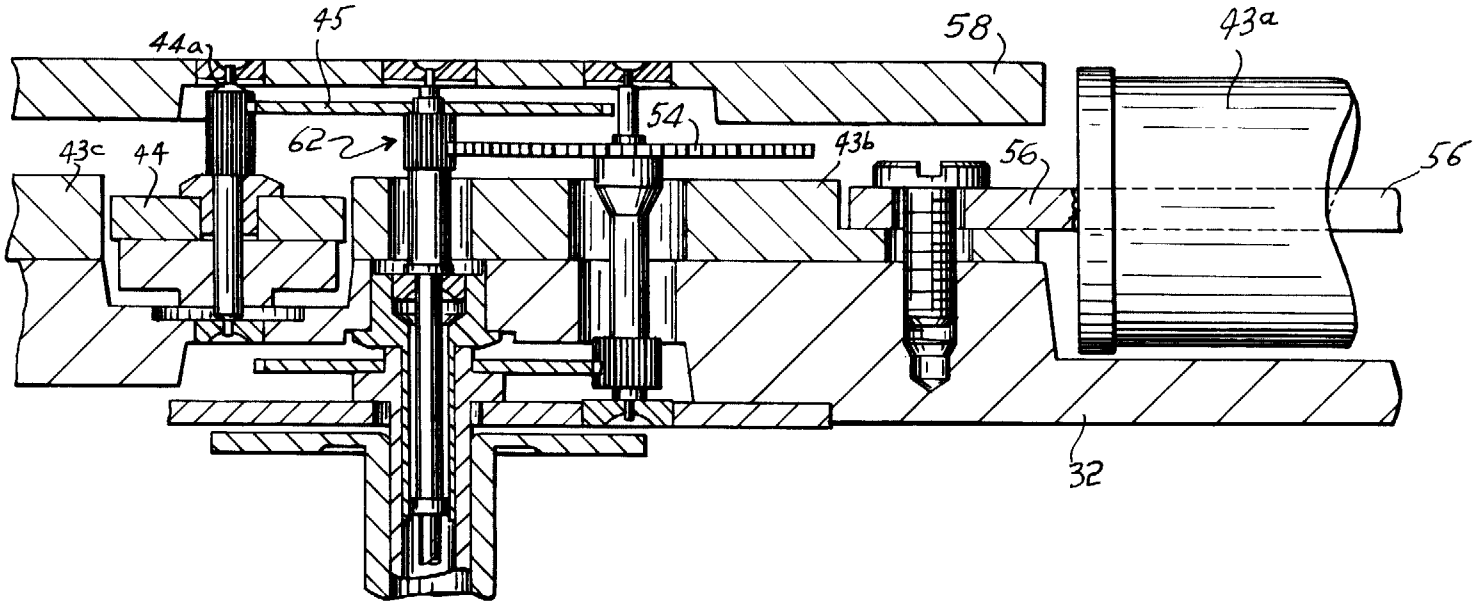
FIG. 7 is a cross-sectional view of the stepping mechanism depicted in FIG. 6.

Reference is now made to FIGS. 6 and 7 wherein a stepping motor assembly is provided enabling the thickness of the electronic timepiece depicted in FIG. 5 to be further diminished, like reference numerals being utilized to depict like elements. Specifically, the stepping motor mechanism, generally indicated at 60 in FIG. 6, and the gear train mechanism, generally indicated at 62 in FIG. 7 allow both such assemblies to be contained within the plate of the wrist watch thereby providing for a thinner wrist watch mechanism. This is achieved by placing the coil and rotor in the same plane in the manner hereinafter discussed.

It is noted that in electro-mechanical converters such as stepping motors, a driving coil is normally wound about the stator and a rotor is disposed inside the coil and is rotated by the stator coil. Such configuration results in a unitary motor which is easily disengageable from the timepiece. However, such motors cause sharp increases in the thickness of the timepiece thereby rendering same not suited for thin, small sized round wrist watches.

Accordingly, as is particularly depicted in FIGS. 6 and 7, the coil 43a is wound about a coil core 56 which is coupled to yokes 43b and 43c, which yokes act as stators and are disposed in the same plane as rotor 44. The rotor 44 is mounted on shaft 44a, which is supported by gear train bridge 58 which bridge also supports the shafts of gear train members including fourth wheel 45 and third wheel 54. Thus, because the rotor shaft 44a and the coil 43a have about the same height, the thickness of the timepiece can be reduced to the order of the coil. Furthermore, by merely removing bridge 58, it is easy to remove the rotor 44 and the entire gear train if it is desired to fix same. The stator defined by coil core 56 and yokes 43b and 43c can likewise be separately removed from plates 32. Accordingly, by providing yokes for the stator and a bridge member as depicted in FIGS. 6 and 7, a thinner round electromechanical wrist watch is provided.

The foregoing arrangement provides for simplified terminal connections and for a round, particularly flat watch movement. Further, three major components of the watch, specifically the battery power source, the oscillator and associated circuitry and the mechanical components of the watch, may be readily separated, with the function of each block being separately adjustable. This feature, which permits the removal of components by merely removing selected screws, is particularly advantageous to after-sales service. Further, this arrangement is also particularly adapted for mass production.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a quartz crystal wrist watch, the improvement which comprises a quartz crystal time standard oscillator means for providing a high frequency time standard signal, a dividing circuit for providing low frequency time [signals] *signal* in response to said time standard [signals] *signal* from said time standard oscillator means, a stepping motor being driven in response to the low frequency timing signals applied by said dividing circuit, said stepping motor including a driving coil, a yoke formed of high permeability materials disposed through said driving coil and formed with spaced ends defining poles lying in the same plane as said driving coil and a rotor disposed in the gap between said poles and lying in the same plane as said driving coil; battery power means coupled to said time standard oscillator means, dividing circuit and driving coil for energizing same; a support plate; said driving coil, battery power means and quartz crystal time standard oscillator means being supported on peripheral regions of said plate out of overlapping relation with each other and with said rotor; a bridge member; and a gear train mechanically coupled to said rotor to be driven thereby, said rotor and at least the portion of said gear train coupled thereto being supported by said bridge member and said plate at a central region of said plate.

2. A quartz crystal watch as claimed in claim 1, wherein said rotor is mounted on a shaft, said rotor shaft being substantially the same height as said coil.

3. A quartz crystal watch as claimed in claim 1, wherein said yoke and coil are removably mounted on said wrist watch for removal independent of said rotor.

*4. A quartz crystal watch as claimed in claim 1, wherein said dividing circuit is formed from MOS transistors.*

*5. In a quartz crystal wrist watch, the improvement which comprises a quartz crystal time standard oscillator means for providing a high frequency time standard signal; battery power means coupled to said time standard oscillator means; a dividing circuit for providing a low frequency time signal in response to said time standard signal from said time standard oscillator means; a stepping motor including a driving coil coupled to receive as an input thereto said low frequency time signal, a stator magnetically coupled to said driving coil and a rotor formed of permanently magnetic material and magnetically coupled to said stator, said rotor including a mechanical output transmitting member; mechanical gearing coupled to said mechanical output member for driving by said rotor; a bridge member; and a support plate, said rotor, driving coil and stator being arranged in a plane substantially parallel to the plane of said support plate within the area defined by said support plate, said mechanical gearing, mechanical output transmitting member and rotor being supported by said support plate and bridge member at a central region of said support plate, said battery power means and time standard oscillator means being located out of overlapping relation with each other and with said driving coil, said driving coil and battery power means being supported on peripheral regions of said plate.*

*6. A quartz crystal watch as claimed in claim 5, wherein said dividing circuit is formed from MOS transistors.*

* * * * *